Sept. 26, 1967 D. A. WILHELMSON 3,344,378

MAGNETIC DETENT

Filed July 30, 1965

INVENTOR.
DONALD A. WILHELMSON

BY Harry M. Saragovitz,
Edward J. Kelly, Herbert Berl
& Julian C. Keppler
ATTORNEYS United States Patent Office 3,344,378

Patented Sept. 26, 1967

3,344,378
MAGNETIC DETENT

Donald A. Wilhelmson, Palo Alto, Calif., assignor, by mesne assignments, to the United States of America as represented by the Secretary of the Army Filed July 30, 1965, Ser. No. 476,217
6 Claims. (Cl. 335—272)

ABSTRACT OF THE DISCLOSURE

A magnetic detent for a rotating shaft combining both coarse and fine detent positions. A ring shaped rotor has coarse teeth formed along the inner portion and fine teeth formed along the outer portion with each set of teeth matching corresponding sets of coarse and fine teeth on an inner and outer stator respectively.

Figure 1A:
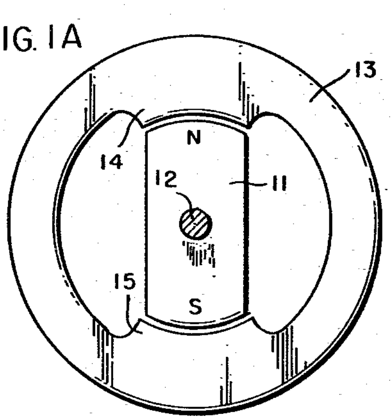

This invention relates to detent devices and more particularly to a magnetic detent having a design which exhibits the combined advantages of coarse and fine magnetic detents.

Basically, a magnetic detent consists of two slotted magnetic parts which are positioned so that one part can move past the other with a small clearance between them. If one of these parts is magnetized so that magnetic flux is induced across the air gap from one part to the other, the two parts will tend to align themselves with poles opposite poles, which is the position of maximum magnetic permeance across the gap. Since the aligning force is approximately proportional to the rate of change of permeance as one part is moved out of alignment with the other, this force can be increased by using a larger number of narrower poles. A possible disadvantage of increasing the number of poles is that the number of detent positions is also increased.

It is therefore an object of this invention to provide a magnetic detent which exhibits a strong alignment force and yet contains a relatively few number of detent positions.

The magnetic detent of this invention combines the advantages offered by both fine and coarse detents. The preferred embodiment consists of a ring-shaped rotor having coarse teeth formed along the inner portion thereof which teeth match a corresponding set of teeth on an adjacent stator. The rotor also has fine teeth formed along the outer portion thereof which match a corresponding set of teeth on an adjacent (outer) stator. This results in a number of detents which is determined by the number of coarse teeth, but which has an increased alignment force due to the presence of the small teeth.

Figure 1B:
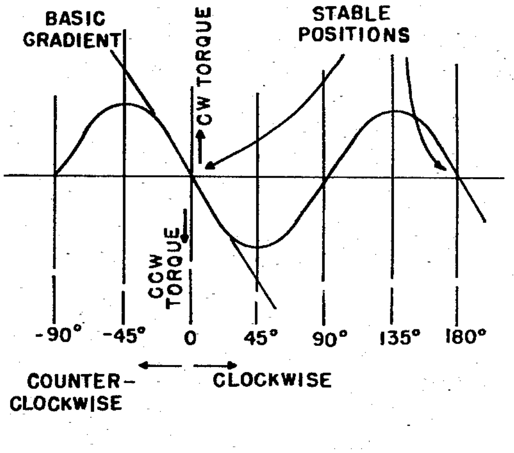
Figure 2A:
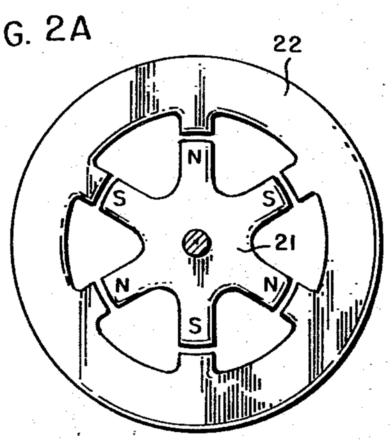
Figure 2B:
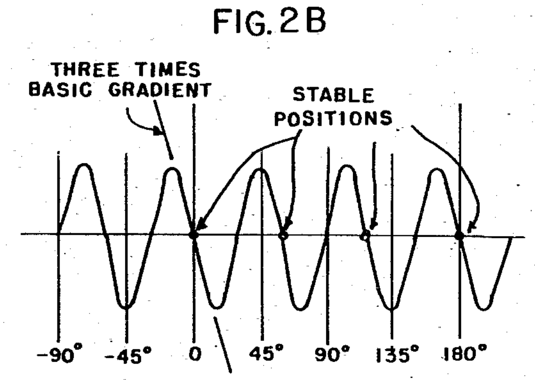
Figure 3:
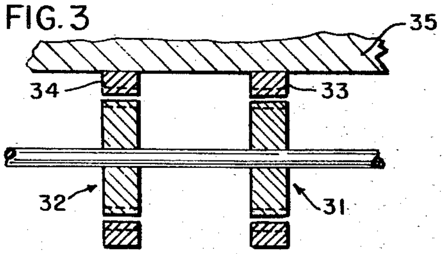
Figure 4:
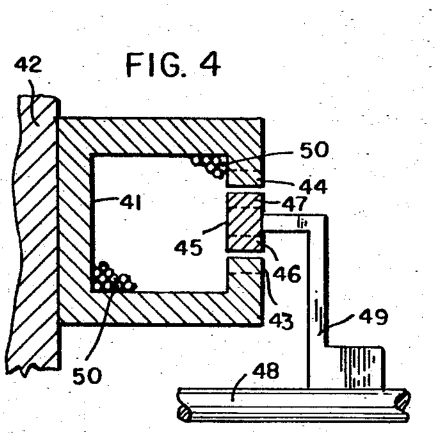
Figure 5:
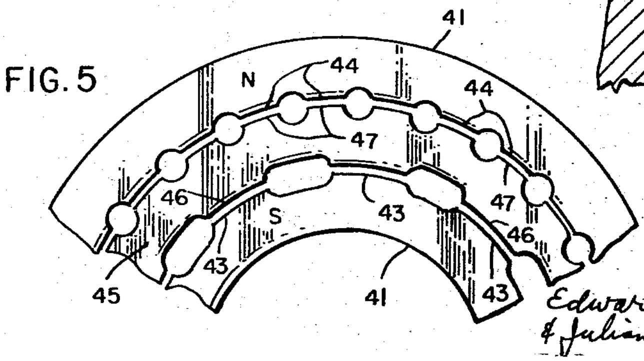

The above and other objects and advantages of this invention will become apparent from the detailed description of the invention given in connection with the drawing in which:

FIG. 1A shows a crude magnetic detent,

FIG. 1B is a graph which illustrates the variation of torque with respect to the angle of rotation of the detent of FIG. 1A, FIG. 2A shows a magnetic detent having six poles, FIG. 2B is a graph of torque vs. angle of rotation of the detent of FIG. 2A, FIG. 3 shows an improved magnetic detent having a coarse and a fine detent mounted on the same shaft, FIG. 4 is a partial cross-sectional view of a preferred embodiment of this invention wherein two types of detent devices have series magnetic paths, and FIG. 5 shows a view of the rotor and stator of the detent device of FIG. 4.

A crude magnetic detent is shown in FIG. 1A. A bar magnet 11 mounted on a shaft 12 rotates within a stationary iron ring 13 which has two poles 14 and 15 which project in toward the rotor. The rotor 11 will tend to line up with the two poles 14 and 15 and will resist with considerable force any attempt to rotate the rotor out of alignment with these poles. Since the stator 13 is merely iron and not a permanent magnet, each of its poles will line up with either the north or south poles of the rotor. The detent shown in FIG. 1A therefore has two stable positions. FIG. 1B illustrates the variation of torque tending to restrain rotation with respect to angle of rotation of the detent of FIG. 1A. The stable positions occur where-ever the curve crosses the zero axis with a negative slope.

FIG. 2A shows a magnetic detent having a rotor 21 and a stator 22 each having six poles. This detent has three times as many poles as the detent of FIG. 1A, but each pole has only one-third the width of the original poles, so that the size and weight are about the same as the two-pole detent. The six-pole detent has six stable positions, which is three times as many as the two-pole detent. In addition, the six-pole detent has an important characteristic which may not be readily apparent. The spring-like magnetic force tending to hold the six-pole detent in alignment is much greater than the force exhibited by the two-pole detent. This is due to the fact that the restoring force at any given misalignment angle is proportional to the total flux and to the rate of change of magnetic permeance with misalignment angle at that angle. Since the maximum and minimum permeances are approximately equal in the two detents of FIGS. 1A and 2A, the rate of change of permeance, and hence the peak force, is theoretically three times as great in the six-pole detent. And since this greater peak force is reached in one-third the angular deflection, the force gradient is theoretically nine times the force gradient in the two-pole detent. Several other factors, including the variation in flux, act to reduce this difference to much less than a factor of nine, but the six-pole detent is still much more rigidly held in alignment than the two-pole detent.

From the graph in FIG. 2B it can be seen that the maximum torque is reached more quickly with the six-pole detent. For the purposes of this graphical analysis, it is assumed that the force is the same as that illustrated in FIG. 1B and that the gradient of the six-pole detent is three times greater than that of the two-pole detent.

This increase in force gradient is often of considerable value in a magnetic detent, but the accompanying increase in the number of detent positions is usually unacceptable. In some applications it is desirable to obtain the high force gradient of the many-pole detent and yet have a detent with a lesser number of detent positions.

This result is accomplished by the detents to be hereinafter described. The result can be achieved by using two detents on the same shaft as is shown in FIG. 3. One is a coarse detent 31 having the desired number of poles; the other is a fine detent 32 having a larger number of poles to provide an increased force gradient. The stators 33 and 34 of the two detents are shown as being fixed to a stationary member 35. The total force at any angle will be the sum of the forces of the two detents.

It is also possible to combine the characteristics of coarse and fine detents by arranging the two detents so that they are magnetically in series. FIGS. 4 and 5 show a preferred embodiment for accomplishing this effect. A toroidal stator 41, which has a C-shaped cross-section, is attached to a stationary member 42. The stator 41 has a plurality of coarse poles 43 and a plurality of fine poles 44 which extend toward each other from opposite legs of the C-shaped stator. A ring shaped rotor 45 is situated between the coarse and fine poles of the stator and contains coarse poles 46 and fine poles 47 which are respectively positioned adjacent the coarse and fine poles of the stator so that all the stator poles are separated from their adjacent rotor poles by a small air gap. The rotor is connected to a shaft 48 by a support member 49.

In FIG. 5 the two stator portions are designated N and S respectively. The stator could be permanently magnetized or could utilize a coil 50 to form an electromagnet. The design illustrated minimizes the weight of the rotor since the electromagnet is associated with the stator, thereby minimizing rotor inertia. This is an important feature when high stepping rates are necessary.

The combined coarse and fine detent exhibits a strong alignment force and yet contains fewer detent positions than the number of fine poles. However, the relationship between the coarse detent and the fine detent should satisfy several conditions:

(1) The two detents should be aligned so that each stable position of the coarse detent coincides with a stable position of the fine detent. (Not necessarily vice versa, however.) This means that the number of poles in the fine detent must be a multiple of the number of poles in the coarse detent.

(2) The number of poles in the fine detent should preferably be an odd multiple (3 times, 5 times, etc.) of the number of poles in the coarse detent. An even multiple tends to flatten out the force gradient at the unstable positions, creating dead spots or false detents.

(3) The forces of the two detents must have the proper relative magnitude. If the fine detent is too weak, the overall gradient will be no stiffer than a simple coarse detent. If the fine detent is too strong it may cause the total force curve to approach zero between stable points, resulting in dead spots or even in false intermediate stable positions.

One way of making the above relation less critical is to provide two or more fine detents, say one 3-times and one 5-times the number of poles in the coarse detent. These tend to offset each other except at the stable points.

What is claimed is:

1. A magnetic detent comprising: a shaft which is to exhibit a given number of detent positions; stator means having a first plurality of stator poles equal in number to said detent positions and a second plurality of stator poles which are greater in number than said first plurality of poles; and rotor means having two sets of poles which are equal in number to said first and second plurality of stator poles respectively, said rotor and stator poles being positioned so that said given number of detent positions exist where both said first and second plurality of rotor and stator poles are aligned with a small air gap therebetween.

2. A magnetic detent as set forth in claim 1, wherein the rotor means is a ring shaped rotor connected to said shaft, said rotor exhibits a first plurality of equally spaced pole protrusions extending radially inward therefrom and a second plurality of equally spaced pole protrusions extending radially outward therefrom; said stator means is positioned adjacent said first and second plurality of pole protrusions and separated therefrom by an air gap, for inducing a magnetic flux across said air gap and thereby tending to align said rotor at given positions with respect to said stator means.

3. A magnetic detent as set forth in claim 2 in which the number of said first plurality of equally spaced pole protrusions extending radially inward from said rotor is equal to said given number of detent positions.

4. A magnetic detent as set forth in claim 3 in which the number of said second plurality of pole protrusions is a multiple of the number of said first plurality of pole protrusions.

5. A magnetic detent as set forth in claim 2 wherein said stator means comprises a hollow toroid of magnetizable material having a C-shaped cross-section, the open portion of said C-shaped cross-sectional toroid forming an annular slot in which said rotor is located, the edges of said annular slot having pole protrusions which are respectively equal in number to the pole protrusions of said rotor.

6. A magnetic detent as set forth in claim 5 which further comprises a coil wound inside said toroid.

References Cited

UNITED STATES PATENTS

| | | | |
|---|---|---|---|
| 2,627,040 | 1/1953 | Hansen | 310—49 |
| 2,837,670 | 6/1958 | Thomas et al. | 310—49 |
| 3,042,818 | 7/1962 | Busch | 310—49 |

BERNARD A. GILHEANY, *Primary Examiner.*

G. HARRIS, *Assistant Examiner.*